US012697960B2

(12) United States Patent
Wang et al.

(10) Patent No.: US 12,697,960 B2
(45) Date of Patent: Aug. 4, 2026

(54) METHOD AND SYSTEM FOR IDENTIFYING TIME-VARYING CHARACTERISTICS OF HEAVY-LOAD VEHICLE SUSPENSION

(71) Applicant: SHANGHAI JIAO TONG UNIVERSITY, Shanghai (CN)

(72) Inventors: Yafei Wang, Shanghai (CN); Mingyu Wu, Shanghai (CN); Xulei Liu, Shanghai (CN); Zhisong Zhou, Shanghai (CN); Zexing Li, Shanghai (CN); Jin Chen, Shanghai (CN); Yichen Zhang, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 19/169,102

(22) Filed: Apr. 3, 2025

(65) Prior Publication Data

US 2025/0319861 A1      Oct. 16, 2025

(30) Foreign Application Priority Data

Apr. 12, 2024    (CN) .......................... 202410441711.6

(51) Int. Cl.
*B60W 30/02* (2012.01)
*B60W 40/13* (2012.01)
(Continued)

(52) U.S. Cl.
CPC ............ *B60W 30/02* (2013.01); *B60W 40/13* (2013.01); *B60W 50/0097* (2013.01);
(Continued)

(58) Field of Classification Search
CPC .. B60W 30/02; B60W 40/13; B60W 50/0097; B60W 2040/1315;
(Continued)

(56) References Cited

FOREIGN PATENT DOCUMENTS

CN        117725537 A  *  3/2024

OTHER PUBLICATIONS

Hamza, Anis & Yahia, Noureddine, Heavy Trucks with Intelligent Control of Suspension based on Deep Learning, 2020, pp. 1-8.*

* cited by examiner

*Primary Examiner* — Andrew R Dyer
(74) *Attorney, Agent, or Firm* — CBM PATENT CONSULTING, LLC

(57)                ABSTRACT
A method and system are provided for identifying time-varying suspension characteristics of heavy-load vehicles. The method includes collecting sequential control state data of a mining truck using sensors, predicting parameter-related factors through a deep learning network, estimating suspension stiffness and damping coefficients via a linear dynamic model considering longitudinal-vertical coupling, and predicting future system states through a nonlinear dynamic model based on the estimated parameters and learned factors. According to the method, a deep learning network is integrated into a physical model of the mining truck, an accurate longitudinal-vertical dynamical model of the mining truck is established, accurate suspension parameters are identified, the stiffness damping time-varying characteristics of the suspension of the mining truck are given through a physical model-data driving method, and the model has certain interpretability and generalization; the rigidity and damping of the four suspensions can be obtained only through sprung information.

5 Claims, 8 Drawing Sheets

(51) Int. Cl.
    *B60W 50/00*       (2006.01)
    *G06N 3/0442*     (2023.01)

(52) U.S. Cl.
    CPC ... *G06N 3/0442* (2023.01); *B60W 2040/1315*
          (2013.01); *B60W 2300/125* (2013.01); *B60W*
            *2510/225* (2013.01); *B60W 2520/105*
          (2013.01); *B60W 2520/14* (2013.01); *B60W*
          *2520/16* (2013.01); *B60W 2520/18* (2013.01)

(58) Field of Classification Search
    CPC ... B60W 2040/1307; B60W 2300/125; B60W
           2510/225; B60W 2520/105; B60W
         2520/14; B60W 2520/16; B60W 2520/18;
          B60W 2050/0035; B60W 10/22; G06N
          3/0442; G06F 30/15; G06F 30/20; G06F
                          30/27
    USPC ........................................................ 701/40
    See application file for complete search history.

METHOD AND SYSTEM FOR IDENTIFYING TIME-VARYING CHARACTERISTICS OF HEAVY-LOAD VEHICLE SUSPENSION

CROSS-REFERENCE TO RELATED APPLICATIONS

This application claims priority to Chinese Patent Application Ser. No. CN202410441711.6 filed on 12 Apr. 2024

TECHNICAL FIELD

The present invention relates to the field of mining truck control systems, particularly to a method and system for identifying time-varying suspension characteristics in heavy-load vehicles.

BACKGROUND TECHNIQUE

Existing mining truck suspension simulation technologies fail to accurately model or quantify the time-varying stiffness and damping characteristics of the suspension. Most literature only provides statistical data.

SUMMARY OF THE INVENTION

The invention addresses the shortcomings of the existing technology by proposing a method and system for identifying time-varying characteristics of heavy-load vehicle suspension. It integrates a deep learning network into the physical model of mining trucks to establish an accurate longitudinal-vertical dynamics model and identify precise suspension parameters. The method uses a physical model-data-driven approach to provide time-varying stiffness and damping characteristics of the mining truck suspension, with the model itself having a certain degree of interpretability and generalizability. The method only requires information from the sprung mass (one IMU) to obtain the stiffness and damping of the four suspensions, offering advantages such as simple architecture and ease of implementation.

The invention is achieved through the following technical solution:

The invention involves a method for identifying time-varying characteristics of heavy-load vehicle suspension. Sequential operational data is collected by sensors installed on the mining truck. A deep learning network is used to predict parameter-related factors based on the sequence state. At the same time, a linear dynamics model considering longitudinal-vertical coupling effects roughly estimates the stiffness and damping coefficients as key suspension parameters. A nonlinear dynamics model considering longitudinal-vertical coupling effects then predicts the state at the next time step based on the parameter-related factors and key suspension parameters.

The state loss Lp between the predicted state and the target state detected by the sensors serves as the loss error term for the deep learning network to update the network parameters.

The linear dynamics model considering longitudinal-vertical coupling effects includes a body with mass $m_c$ and moment of inertia Ic, and front and rear axles with unsprung masses $m_{tf}$ and $m_{tr}$ respectively. The suspension forces transmitted to the body from the front and rear axles are $F_f$ and $F_r$, and the road excitations for the front and rear tires are $z_{qf}$ and $z_{qr}$. The degrees of freedom (DoF) of the model include the vertical displacement of the center of gravity (CoG)$z_c$, the pitch angle $\theta_c$, and the vertical displacements of the front and rear unsprung masses $z_{tf}$ and $z_{tr}$. $F_c$ represents the inertial force acting on the CoG due to acceleration a and velocity v along the x-axis, and $M_c$ represents the moment of inertia. The suspension stiffness and damping coefficients are k and c, with subscripts f and r representing the front and rear suspensions, and subscript t representing the tire. The distances from the CoG to the front and rear axles are $a_c$ and $b_c$ respectively, and the vertical distance between the CoG and the pitch center PC is $\Delta h$.

The deep learning network includes a three-layer LSTM network layer and a fully connected network layer. Each LSTM layer has 128 hidden units, and the fully connected network layer outputs the suspension stiffness and damping correction coefficients.

A computer device, comprising a memory and a processor, wherein the memory stores a computer program, and the processor executes the computer program to implement the method for identifying time-varying characteristics of heavy-load vehicle suspension.

A computer readable storage medium, wherein the medium stores a computer program, and the program is executed by processor to implement method for identifying time-varying characteristics of heavy-load vehicle suspension.

Technical Effect

The invention combines physical and learning methods to establish a hybrid modeling architecture, separately identifying the time-varying stiffness and damping parameters of the front and rear suspensions of mining trucks under different conditions. Compared to existing technologies, the invention facilitates the unified expression of subsequent hybrid models, enabling data-driven identification of suspension parameters and accelerating the convergence of neural networks. It can accurately predict the vertical dynamic characteristics of mining trucks.

The time-varying characteristic identification method for heavy vehicle suspensions presented in this application offers substantial industrial value. By integrating real-time sensor data from mining trucks with the *Simplified Refined Instrumental Variable for Continuous-time (SRIVC) system identification technique, this approach leverages neural networks to iteratively optimize nonlinear suspension parameters. This enables highly accurate dynamic estimation of suspension stiffness and damping coefficients.

In mining operations, the method supports real-time suspension health monitoring and adaptive parameter adjustment to handle fluctuating loads. As a result, it improves vehicle stability under heavy-duty and off-road conditions while prolonging suspension system longevity. Key benefits include:

1) 20-30% reduction in maintenance downtime;
2) Lower repair costs through predictive maintenance;
3) Enhanced safety in overload scenarios, making it ideal for open-pit mining, large-scale construction, and other heavy-haul applications.

DETAILED DESCRIPTION OF INVENTION

Figure 1:
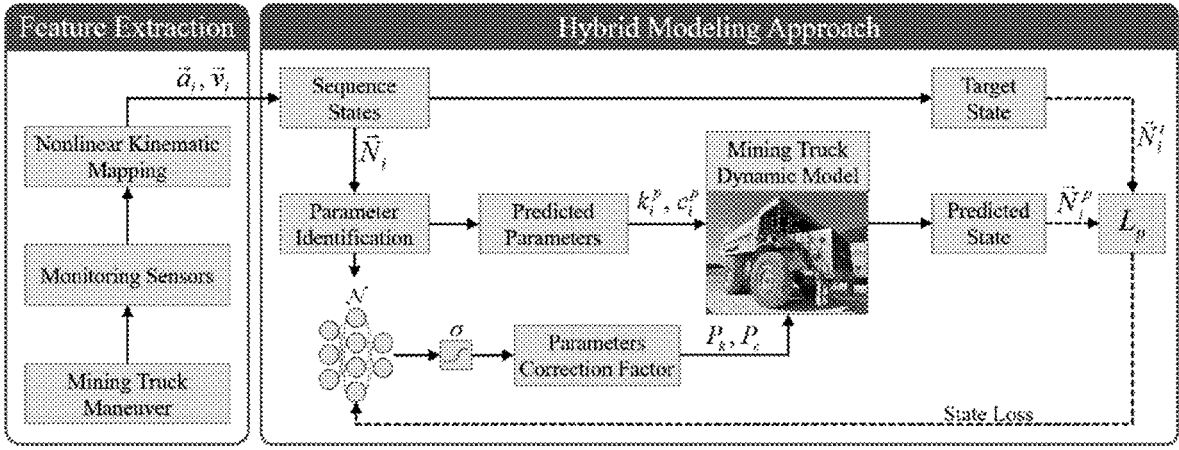
FIG. 1 shows a schematic diagram of the vertical apparent dynamics identification method for mining trucks.

As shown in FIG. 1, the embodiment involves a method for identifying time-varying characteristics of heavy-load vehicle suspension. Sensors collect the sequence state of mining truck operations, and a deep learning network predicts parameter-related factors based on the sequence state. At the same time, a linear dynamics model considering longitudinal-vertical coupling effects roughly estimates the suspension stiffness and damping coefficients as key suspension parameters. A nonlinear dynamics model considering longitudinal-vertical coupling effects then predicts the state at the next time step based on the parameter-related factors and key suspension parameters.

Figure 2:
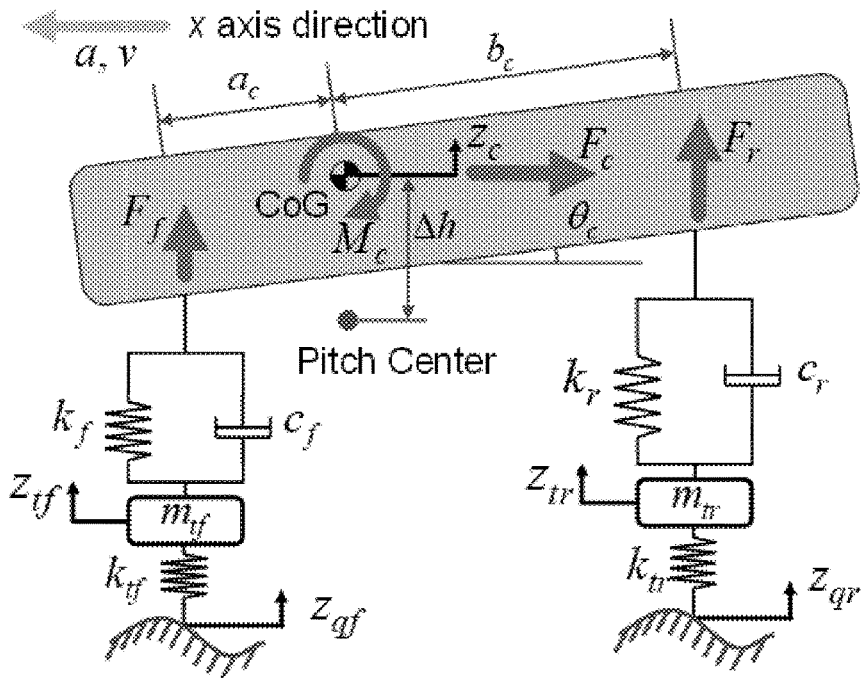
FIG. 2 shows a schematic diagram of the nonlinear dynamics model considering longitudinal-vertical coupling effects.

As shown in FIG. 2, the nonlinear dynamics model considering longitudinal-vertical coupling effects has a defined positive direction. It includes a body with mass $m_c$ and moment of inertia Ic, and front and rear axles with unsprung masses $m_{tf}$ and $m_{tr}$ respectively. The suspension forces transmitted to the body from the front and rear axles are $F_f$ and $F_r$, and the road excitations for the front and rear tires are $z_{qf}$ and $z_{qr}$. The degrees of freedom (DoF) of the model include the vertical displacement of the center of gravity (CoG) $z_c$, the pitch angle $\theta_c$, and the vertical displacements of the front and rear unsprung masses $z_{tf}$ and $z_{tr}$. $F_c$ represents the inertial force acting on the CoG due to acceleration $a$ and velocity $v$ along the x-axis, and $M_c$ represents the moment of inertia. The suspension stiffness and damping coefficients are k and c, with subscripts f and r representing the front and rear suspensions, and subscript t representing the tire. The distances from the CoG to the front and rear axles are $a_c$ and $b_c$ respectively, and the vertical distance between the CoG and the pitch center PC is $\Delta h$.

According to D'Alembert's principle, the longitudinal-vertical dynamics model of the mining truck is $$\begin{cases} 0 = F_f + F_r - m_c \ddot{z}_c \\ 0 = F_r b_c - F_f a_c - \Delta h \cdot m_c a - I_c \ddot{\theta}_c \\ 0 = k_{tf}(z_{qf} - z_{tf}) - F_f - m_{tf} \ddot{z}_{tf} \\ 0 = k_{tr}(z_{qr} - z_{tr}) - F_r - m_{tr} \ddot{z}_{tr} \end{cases},$$

where the force exerted by the body on the suspension is $$\begin{cases} F_f = k_f(z_{tf} - z_c + a_c\theta_c) + c_f(\dot{z}_{tf} - \dot{z}_c + a_c\dot{\theta}_c) \\ F_r = k_r(z_{tr} - z_c - b_c\theta_c) + c_r(\dot{z}_{tr} - \dot{z}_c - b_c\dot{\theta}_c) \end{cases}.$$

Preferably, the vertical acceleration an velocity at the CoG position are calculated based on the nonlinear mapping relationship of the IMU $$\begin{cases} \dot{z}_c = A(\omega^i \times u^i) \\ \ddot{z}_c = A(\alpha^i \times u^i + \omega^i \times \omega^i \times u^i) \end{cases},$$

specifically including:

1) According to the Euler theorem of rigid body kinematics, the motion of a point in the absolute coordinate system r is decomposed into the translational displacement R in the relative coordinate system plus the vector sum of rotation around the base point:

$$r = R + u$$

$$u = Au^i, u^i = \left[x^i, y^i, z^i\right]^T,$$

where: A is the coordinate rotation matrix, $u_i$ is the projection on the coordinate axis after rotation. OXYZ is the inertial reference frame (absolute reference frame) fixed on the ground; $O_iX_mY_mZ_m$ is the coordinate system (relative coordinate system) fixed on the IMU, with the three-axis direction the same as the inertial reference frame; $O_iX_iY_iZ_i$ represents the coordinate system definition of the IMU itself. P is the point to be measured, u is the vector from the coordinate axis reference point to the measured point.

2) According to the actual situation, reasonably determine the rotation order of the coordinate axis and calculate the rotation matrix: According to vehicle kinematics knowledge, the roll angle and pitch angle are relatively small compared to the yaw angle. Therefore, the rotation order when selecting the coordinate axis is: first rotate around the Z axis (corresponding to the yaw angle $\alpha_c$); then rotate around the Y axis (corresponding to the pitch angle $\theta_c$); finally rotate around the X axis (corresponding to the roll angle $\gamma_e$). Obtain the rotation matrix expression A ($\alpha_c$, $\theta_c$, $\gamma_c$)=$A_\gamma A_\beta A_\alpha$, where: the positive direction of rotation is the right-hand spiral direction, and the expressions of the three rotation matrices are $$A_\alpha = \begin{pmatrix} \cos\alpha_c & -\sin\alpha_c & 0 \\ \sin\alpha_c & \cos\alpha_c & 0 \\ 0 & 0 & 1 \end{pmatrix};$$

$$A_\beta = \begin{pmatrix} \cos\theta_c & 0 & \sin\theta_c \\ 0 & 1 & 0 \\ -\sin\theta_c & 0 & \cos\theta_c \end{pmatrix};$$

3) Calculate the speed of $$A_\gamma = \begin{pmatrix} 1 & 0 & 0 \\ 0 & \cos\gamma_c & -\sin\gamma_c \\ 0 & \sin\gamma_c & \cos\gamma_c \end{pmatrix}$$

point P, and take the derivative of both sides of the expressions of the three rotation matrices with respect to time. The rotation matrix is regular, and its derivative with respect to time is calculated through linear algebra to obtain $\dot{A}=\tilde{\omega}A$, where: the angular velocity matrix of each axis is an antisymmetric matrix $$\tilde{\omega} = \begin{pmatrix} 0 & -\omega_z & \omega_y \\ \omega_z & 0 & -\omega_x \\ -\omega_y & \omega_x & 0 \end{pmatrix},$$

obtain the speed expression of the measured point $$\dot{r} = \dot{R} + \dot{A}u^i = \dot{R} + \tilde{\omega}Au^i$$

$$= \dot{R} + \omega \times u = \dot{R} + A(\omega^i \times u^i)$$

and the acceleration expression of the measured point (the angular acceleration of each axis)

$$\ddot{r} = \ddot{R} + \alpha \times u + \omega \times \omega \times u$$
$$= \ddot{R} + A(\alpha^i \times u^i + \omega^i \times \omega^i \times u^i)'$$

that is, calculate the acceleration (including angular acceleration) of any point rigidly connected to the IMU installation position.

Thus, the motion of the vehicle body is obtained, and the longitudinal-vertical dynamics model of the mining truck is completed.

The key suspension parameters, namely the suspension stiffness and damping coefficients, are obtained in the following way: Take the front suspension as an example, under the input of force $F_f$, obtain the vertical displacement of the sprung mass $z_f$ according to the transfer relationship from the suspension force to the suspension displacement in the dynamics system of the mining truck, and use the system identification method to calculate the suspension stiffness, and calculate the displacement of the unsprung position, specifically including:

1) According to the Laplace transform relationship between force and displacement $$\begin{cases} F_f = (k + cs)(Z_f - Z_{tf}) \\ F_f = (k_{tf} + m_{tf}s^2)Z_{tf} \end{cases},$$

where: the above are all defined, and the script is the Laplace transform of the corresponding variable.

2) By eliminating the vertical displacement of the unsprung mass, the transfer relationship from the suspension force to the suspension displacement in the dynamics system of the mining truck $$\frac{Z_f}{F_f} = \frac{m_{tf}s^2 + c_f s + (k_{tf} + k_f)}{m_{tf}c_f s^3 + m_{tf}k_f s^2 + k_{tf}c_f s + k_{tf}k_f},$$

where: s is the time domain differential operator. According to the measured real-time timing signal of the mining truck, use the continuous-time system simplified refined instrumental variable method (SRIVC) for system identification [22], and rewrite the system transfer equation into the standard form with limited continuous-time white noise e(t)

$$Z_f = G(s)F_f + e(t)$$

$$G(s) = \frac{B(s)}{A(s)} = \frac{b_2 s^2 + b_1 s + b_0}{a_3 s^3 + a_2 s^2 + a_1 s + 1},$$

where: the parameter vector to be identified is $\theta = [a_1, a_2, a_3, b_0, b_1, b_2]^T$;

3) Use the continuous-time state variable filter to perform low-pass filtering on the entire equation to obtain the pre-filtered time derivatives of the input and output required for identification. Since the filtered regression vector $\varphi_f$ is related to the noise vector, the identification result is asymptotically biased. To eliminate the influence of the noise vector, define the instrumental vector at step j $$\varphi_f(t_k) = \frac{1}{A_j(s)}\left[-sZ_f, \ldots, -s^3 Z_f, F_f, \ldots, s^2 F_f\right]^T_{t_k}$$

$$\varphi_f(t_k) = \frac{F_f(t_k)}{A_j(s)}\left[\frac{-sB_j(s)}{A_j(s)}, \ldots, \frac{-s^3 B_j(s)}{A_j(s)}, 1, \ldots, s^2\right]^T,$$

calculate the parameter estimate at step j+1

$$Z_f^f(t_k) = \frac{1}{A_j(p)}Z_f(t_k)$$

$$\theta_{j+1} = \left[\sum_{k=1}^{N}\varphi_f(t_k)\varphi_f^T(t_k)\right]^{-1}\left[\sum_{k=1}^{N}\varphi_f(t_k)Z_f^f(t_k)\right];$$

continue iterating until the error between the identification result and the previous identification result is small enough, that is $$\frac{\|\theta_{j+1} - \theta_j\|_2}{\|\theta_j\|_2} < \grave{o};$$

4) According to the identified system transfer function and the original input-output relationship, use the normalized root mean square error (NRMSE) and the final prediction error (FPE) as evaluation indicators to evaluate the accuracy of the model.

In this embodiment, the high-order term is selected as the calculation method of parameter regression, and the calculation methods of cf=a3/b2, kf=a2/b2 are used. Considering that this test is conducted under the same initial conditions, the suspension stiffness parameters should also be the same. Therefore, the least squares method is used to calculate the suspension stiffness parameters under all working conditions, and the average value of the error evaluation indicators is given. Similarly, the rear suspension also uses the same calculation process. In addition, it also provides a basis for the establishment and training of subsequent network models, and is directly used for the calculation of physical models.

The state at the next time step is identified by combining data-driven and neural network methods to identify suspension parameters, specifically including:

1) Take the front suspension as an example, perform backward differentiation on $\ddot{z}_{tf}$
    to obtain the discrete system expression of the suspension
        at time k $$0 = k_{tf}^k\left(z_{qf}^k - z_{tf}^k\right) - F_f^k - m_{tf}\frac{\dot{z}_{tf}^k - \dot{z}_{tf}^{k-1}}{\Delta t^k},$$

where: the superscripts k and k−1 represent the current state and the last state respectively. The sampling time difference of each state; since the displacement of the unsprung mass is obtained through parameter identification, its differentiation is not accurate, and it needs to be combined with other equations for identification. The speed of the unsprung mass at time k is $$F_f^k = k_{f,new}\left(z_{tf}^k - z_c^k + a_c\theta_c^k\right) + c_{f,new}\left(\dot{z}_{tf}^k - \dot{z}_c^k + a_c\dot{\theta}_c^k\right),$$

$$F_f^{k-1} = k_{f,new}\left(z_{tf}^{k-1} - z_c^{k-1} + a_c\theta_c^{k-1}\right) + c_{f,new}\left(\dot{z}_{tf}^{k-1} - \dot{z}_c^{k-1} + a_c\dot{\theta}_c^{k-1}\right),$$

where: the subscript new represents the parameters modified by the neural network. When the suspension force at time k−1 is introduced, the entire algorithm will iterate, causing the accumulation of errors each time. Introduce the forward differentiation of the body DoF to represent the speed of the unsprung mass at time k−1

$$F_f^{k-1} = \frac{m_c\dot{z}_c^{k-1}b_c - I_c\dot{\theta}_c^{k-1} - \Delta h \cdot m_c a^{k-1}}{L_c},$$

$$\dot{\theta}_c^{k-1} = \frac{\theta_c^k - \theta_c^{k-1}}{\Delta t^{k-1}}, \dot{z}_c^{k-1} = \frac{z_c^k - z_c^{k-1}}{\Delta t^{k-1}},$$

obtain the speed of the unsprung mass $$\dot{z}_{tf}^{k-1}$$

and then obtain $$\begin{cases} \dot{z}_{tf}^{k-1} = \dfrac{F_f^{k-1} - k_{f,new}\left(z_{tf}^{k-1} - z_c^{k-1} + a_c\theta_c^{k-1}\right)}{c_{f,new}} + \dot{z}_c^{k-1} - a_c\dot{\theta}_c^{k-1} \\ \dot{z}_{tf}^k = \left[k_{tf}^k\left(z_{qf}^k - z_{tf}^k\right) - F_f^k\right]\dfrac{\Delta t^k}{m_{tf}} + \dot{z}_{tf}^{k-1} \end{cases},$$

and solve the function to obtain the force transmitted by the front suspension at time k: Ff:

$$f\left(F_f^k\right) = 0;$$

2) For the rear suspension, the equation $$\begin{cases} \dot{z}_{tf}^{k-1} = \dfrac{F_r^{k-1} - k_{r,new}\left(z_{tr}^{k-1} - z_c^{k-1} - b_c\theta_c^{k-1}\right)}{c_{r,new}} + \dot{z}_c^{k-1} + b_c\dot{\theta}_c^{k-1} \\ \dot{z}_{tr}^k = \left[k_{tr}^k\left(z_{qf}^k - z_{tr}^k\right) - F_r^k\right]\dfrac{\Delta t^k}{m_{tr}} + \dot{z}_{tr}^{k-1} \\ F_r^k = k_{r,new}\left(z_{tr}^k - z_c^k - b_c\theta_c^k\right) + c_{r,new}\left(\dot{z}_{tr}^k - \dot{z}_c^k - b_c\dot{\theta}_c^k\right) \end{cases}$$

can be obtained, and the $F_r$ at time k is calculated. Therefore, the motion of the vehicle body is $$\begin{cases} \ddot{\theta}_c^k = \dfrac{F_r^k b_c - F_f^k a_c - \Delta h \cdot m_c a^k}{I_c} \\ \ddot{z}_c^k = \dfrac{F_f^k + F_r^k}{m_c} \end{cases},$$

and according to the forward differentiation method, the predicted state of the vehicle body is summarized as $$\begin{cases} \dot{\theta}_c^{k+1} = \ddot{\theta}_c^k\Delta t^k + \dot{\theta}_c^k \\ \dot{z}_c^{k+1} = \ddot{z}_c^k\Delta t^k + \dot{z}_c^k \end{cases},$$

obtaining the iterative method of the mining truck body parameters in discrete time.

3) The front and rear suspension parameters of the mining truck show nonlinear characteristics under different working conditions. On the basis of previous parameter identification, use the neural network for refined modeling, that is, the updated iterative parameters $$\begin{cases} k_{f,new} = P_{kf} \cdot k_f, c_{f,new} = P_{cf} \cdot c_f \\ k_{r,new} = P_{kr} \cdot k_r, c_{r,new} = P_{cr} \cdot c_r \end{cases},$$

and the neural network obtains $N_{out}=[P_{kf}, P_{kr}, P_{cf}, P_{cr}]$ according to the time series signal $N_{in}=[z_c, \dot{z}_c, \ddot{z}_c, \theta_c, \dot{\theta}_c, \ddot{\theta}_c, a, t, z_{tf}, z_{tr}]$.

Figure 3:
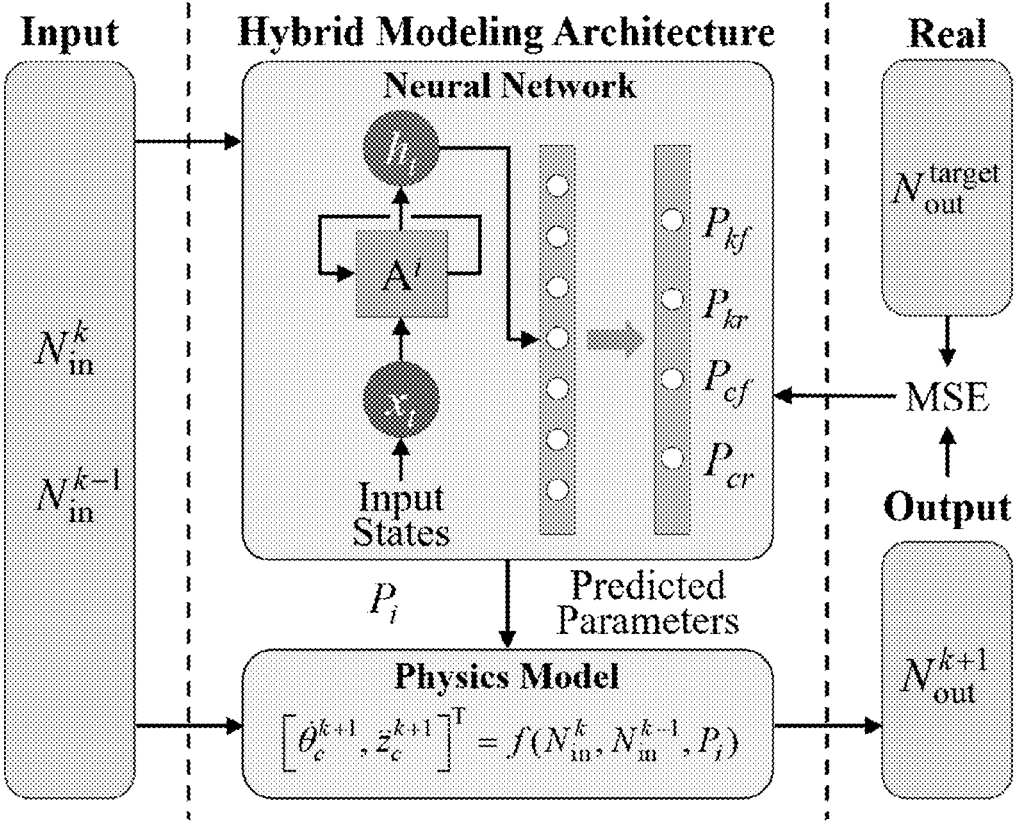
FIG. 3 shows a schematic diagram of the hybrid modeling architecture.

As shown in FIG. 3, the neural network uses a recurrent neural network (RNN), including: a three-layer long short-term memory (LSTM) network and a fully connected layer, where: the hidden layer size is 128, and the fully connected layer calculates the suspension correction parameters and outputs them.

The loss function of the neural network is the mean square error (MSE), and the compared physical signals are the vertical acceleration and pitch rate of the vehicle body sprung mass, specifically:

$$MSE = \frac{1}{n}\sum\left(N_{out}^{test} - N_{out}^{target}\right)_t^2.$$

To avoid the problems of gradient disappearance or gradient explosion during the training of the neural network, the Xavier initialization method is used to initialize the RNN network. The linear output layer uses the normal distribution initialization method to enhance training stability and accelerate network convergence.

Through specific actual experiments, the TR100A mining truck produced by TEREX is selected as the experimental platform. The test site is located in the Ruomaoshan mining area in Wuhu City, Anhui Province, China. In the experiment, the truck position information and all kinematic information were collected by the IFS2100 high-robustness, high-precision positioning and attitude setting system designed by DAISCH. All data were collected at 100 Hz, and the past 2-step state is input into the hybrid neural network model and physical model for calculation.

The sensor is installed on the cabin floor, and its x-axis and z-axis positive directions are the same as the vehicle coordinate system. However, the y-axis positive direction is opposite to the vehicle coordinate system, and the positive direction needs to be considered during calculation.

The experiment is conducted on a flat paved road, and the mining truck is in an unloaded state. For simplicity, the ground excitation is ignored compared to the tire size during transportation. The experiment included longitudinal acceleration and deceleration tests, and the specific tests are shown in Table 1.

TABLE 1

| Mining Truck Test Status | | |
|---|---|---|
| Test Number | Status | Velocity |
| Part 1 | Acceleration | 0-20 km/h |
| Part 2 | | 20-30 km/h |
| Part 3 | Deceleration | 10-0 km/h |
| Part 4 | | 20-0 km/h |
| Part 5 | | 30-0 km/h |

The mining truck size parameters, stiffness characteristics, inertia information, and sensor installation position required during the calculation process are shown in Table 2, where $\Delta x$, $\Delta y$, and $\Delta z$ represent the coordinates of the CoG relative to the IMU installation position. Calculate the suspension stiffness parameters, and the average fitting accuracy (1-NRMSE) under all working conditions is 84.76%, and the average FPE is 0.024. The fitting result has high accuracy and is used as the reference input for subsequent model and network calculations.

TABLE 2

| Mining Truck Parameters | | | |
|---|---|---|---|
| Parameter | Value (Unit) | Parameter | Value (Unit) |
| $a_c$ | 2.33 (m) | $m_{tf}$ | 8150.45 (kg) |
| $b_c$ | 2.24 (m) | $m_{tr}$ | 18423.55 (kg) |
| $\Delta x$ | −3.30 (m) | $k_{tf}$ | $5.25 \times 10^7$ (N/m) |
| $\Delta y$ | −1.24 (m) | $k_{tr}$ | $7.96 \times 10^7$ (N/m) |
| $\Delta z$ | 0.45 (m) | $k_f$ | $1.87 \times 10^6$ (N/m) |
| $\Delta h$ | 1.12 (m) | $k_r$ | $1.93 \times 10^6$ (N/m) |
| $m_c$ | 42046/(kg) | $c_f$ | $1.59 \times 10^4$ (Ns/m) |
| $I_c$ | 234333 (kg · m²) | $c_r$ | $2.00 \times 10^4$ (Ns/m) |

After clarifying the parameters and working conditions of the mining truck, use the above equations to train the network and establish the model. The specific comparison results are given below. Before calculation and network training, all collected data are aligned on the same timeline and converted according to the theory proposed in this invention.

Figure 4:
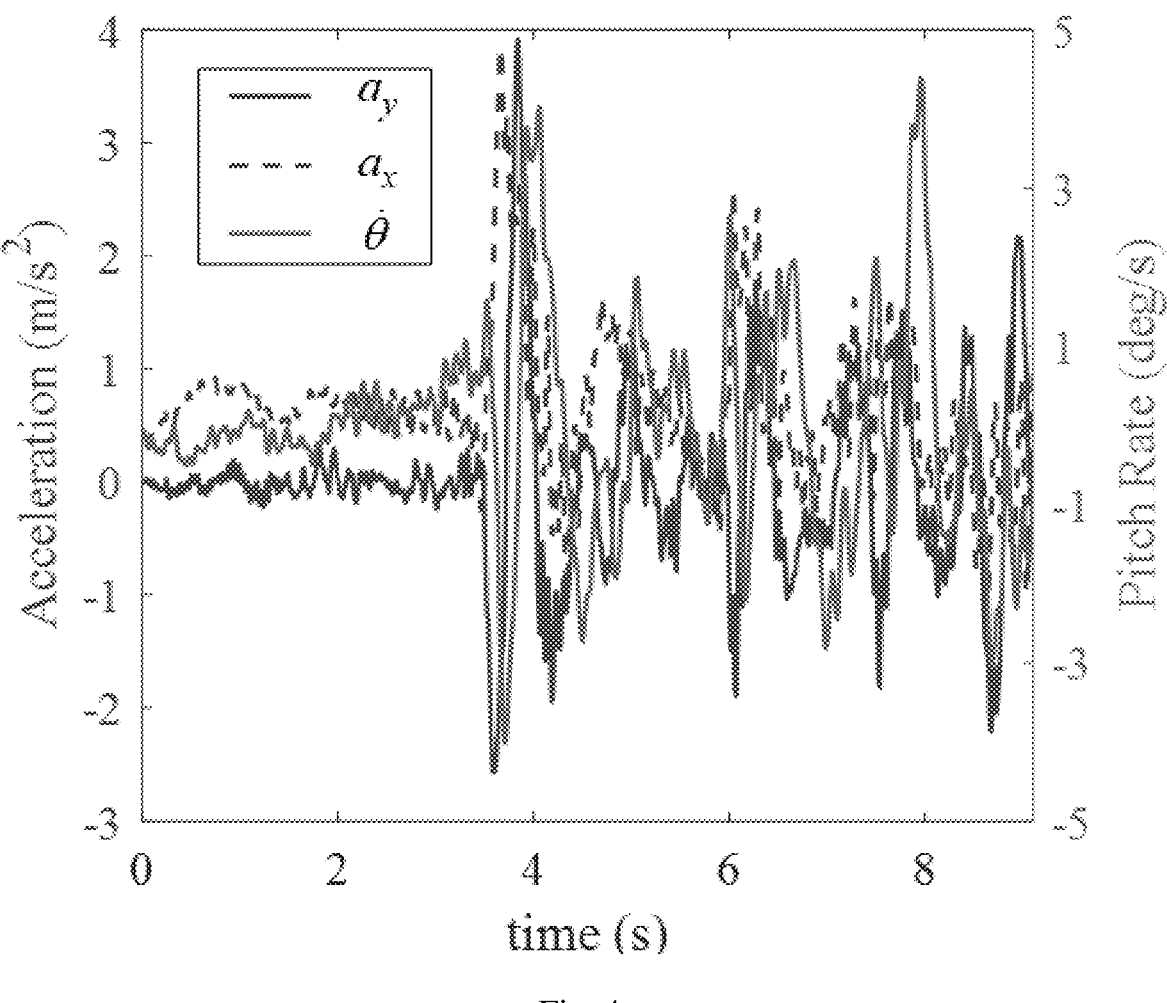
FIG. 4 shows a schematic diagram of the original signals collected by the sensors.
Figure 5:
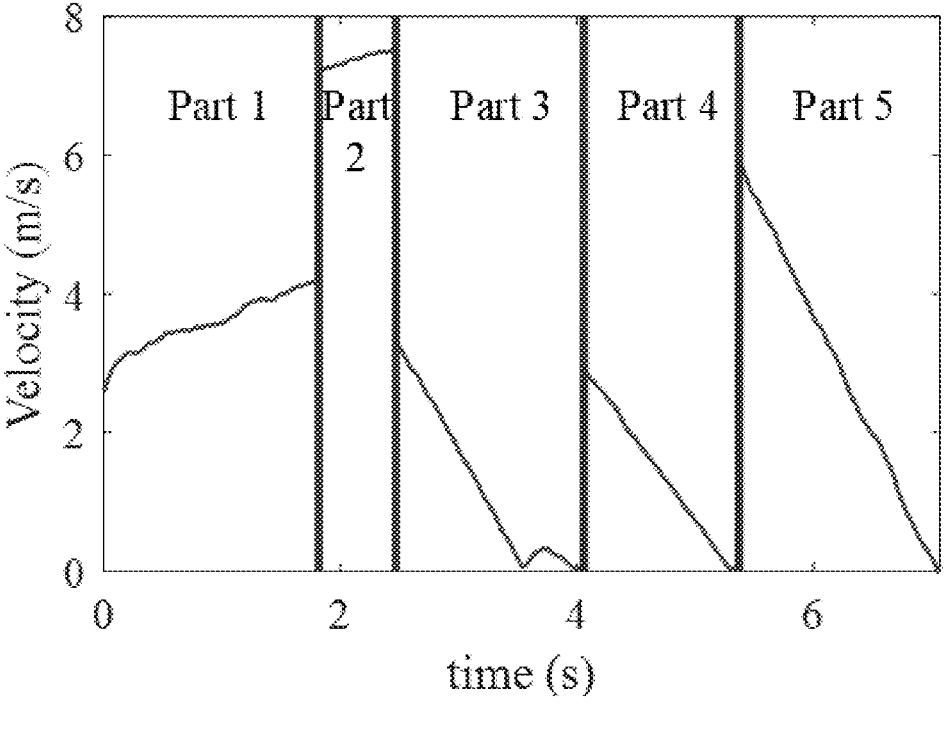
FIG. 5 shows a schematic diagram of the mining truck speed in each test section.

As shown in FIG. 4, it is the original value of the longitudinal acceleration, vertical acceleration, and pitch angular velocity measured by the sensor. As shown in FIG. 5, it is the truck speed in each part of the test set.

During the network training process, distinguish the training set and test set for all working conditions in Table 1. To conduct reasonable training and comparison under different working conditions, use the first 40% and the last 40% of the data of all working conditions as the training set, and the remaining 20% of the data as the test set.

To better verify the accuracy of this invention, select the physical model, data-driven model, and hybrid model for comparison. Among them, the physical model is the classic half-vehicle model, and the data-driven model uses the LSTM network. All training parameters participating in the training of this invention are consistent to verify the applicability of each model. The design of mining trucks generally prevents the cargo from falling due to excessive vertical acceleration during transportation, thereby avoiding transportation capacity loss and road interference. In addition, obtaining the suspension movement speed is also beneficial for subsequent suspension control and tire dynamic load calculation. Therefore, this invention focuses on these two indicators and compares the calculation results of different models.

Figure 6:
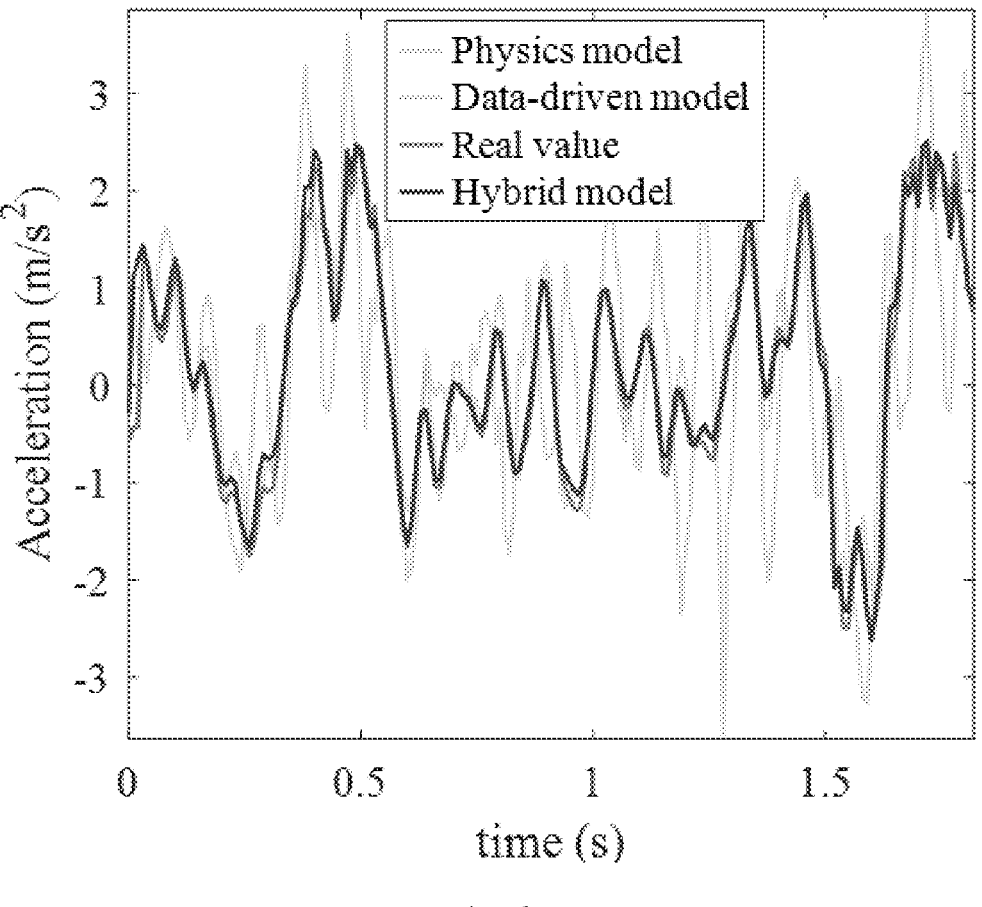
FIG. 6 shows a comparison of vertical acceleration at the CoG (Part 1).
Figure 7:
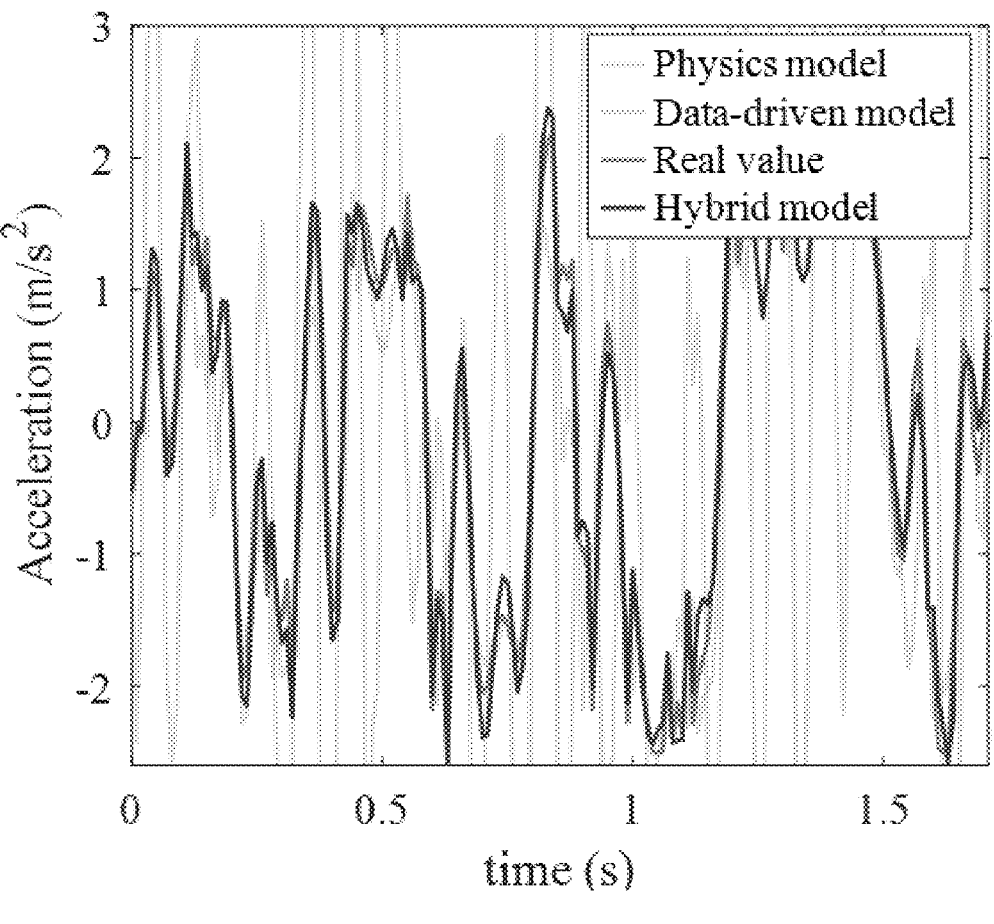
FIG. 7 shows a comparison of vertical acceleration at the CoG (Part 5).

Select Part 1 and Part 5 of the working conditions for display to verify the model effect during acceleration and deceleration. As shown in FIGS. 6 and 7, they are the comparison results of the vertical acceleration of the center of gravity in the two working condition test groups. In the physical model, the calculation of the unsprung position needs to solve the differential equation during the calculation process. This process will introduce errors and oscillations, causing severe oscillations in the final state calculation at the next moment. However, this method has a simple calculation process and can reflect the movement law of the mining truck. The accuracy of the data-driven model is higher than that of the pure physical model, but it is limited by the limited samples and the large number of iterations (about 10-15 epochs, depending on the sample size), which limits its generalization ability. This invention can effectively reflect the real motion state and converge within a limited number of iterations (about 2-3 epochs). From the comparison results, it can also be seen that the hybrid model still has strong robustness under some harsh working conditions. Overall, due to the combination of the advantages of the physical model and the data-driven model, the hybrid model performs better.

Figure 8:
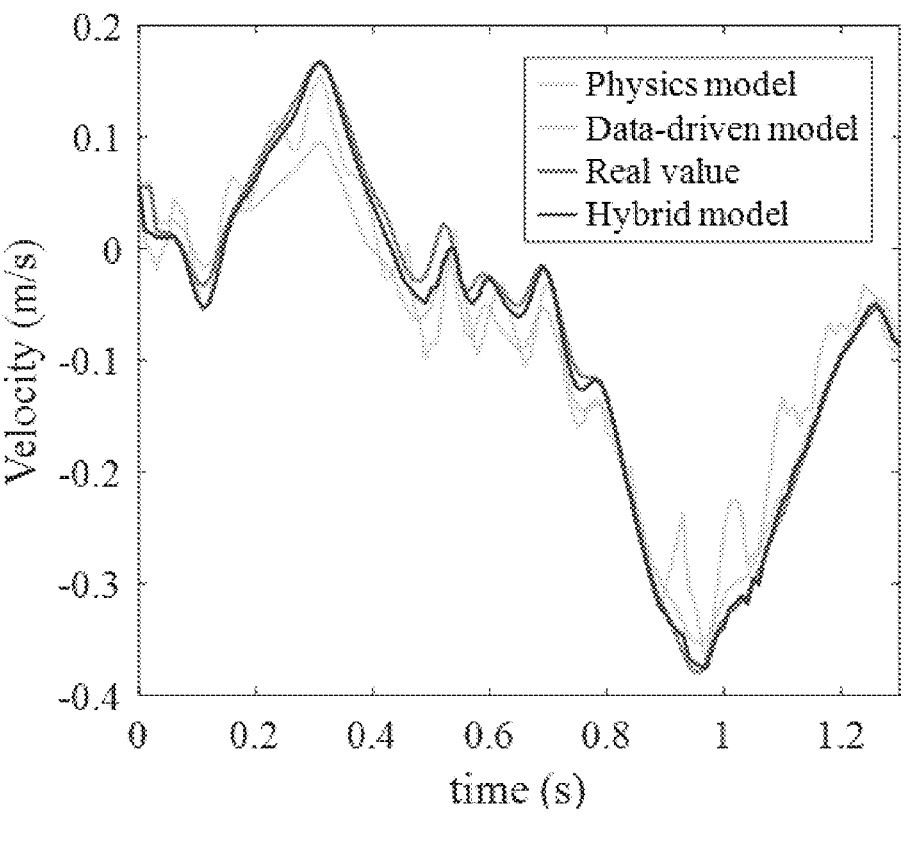
FIG. 8 shows a comparison of front suspension vertical velocity.
Figure 9:
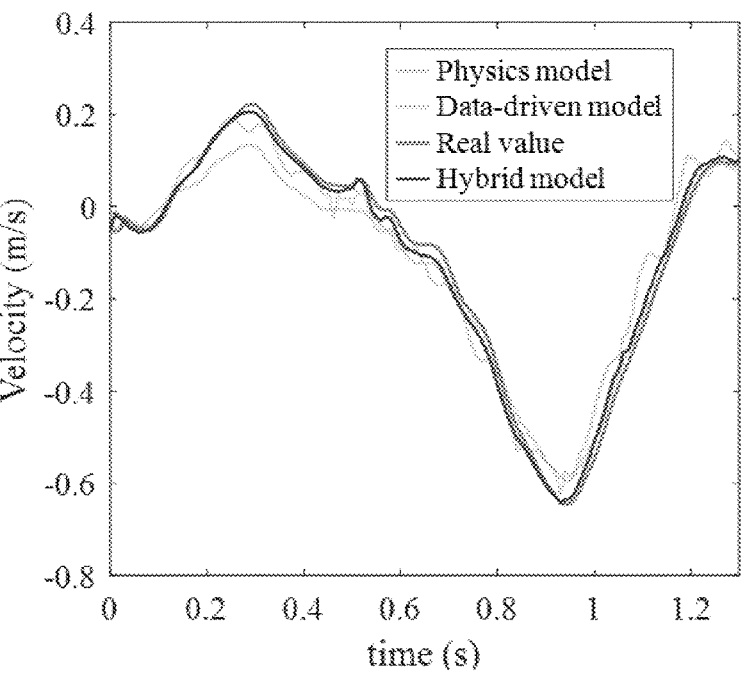
FIG. 9 shows a comparison of rear suspension vertical velocity.

In Part 4 of the working conditions, the comparison results of the vertical speed of the front and rear suspension sprung positions calculated by the vertical speed of the center of gravity (obtained by integrating the acceleration) and the pitch angular velocity are shown in FIGS. 8 and 9. It can be seen that after integral processing, the accuracy of the physical model solution results is significantly improved, and it can represent the movement law of the vehicle body. However, like the data-driven model, the error is still large under specific or harsh working conditions. The hybrid model accurately reflects the sprung speed change pattern in most cases, but in a very few working conditions, the accuracy is not as good as the data-driven model. The reason for this phenomenon may be that the hybrid model only uses two consecutive states, and due to sensor noise, the physical model may amplify the predicted value, resulting in more significant prediction errors at individual points. But overall, the calculation accuracy of the hybrid model is higher than that of the other two models, and its prediction results are relatively more reliable.

To give a qualitative comparison result of the three models, this invention uses the MSE of all test sets as a measure. The smaller the value, the higher the accuracy of the model. The comparison results of the MSE of the vertical acceleration of the center of gravity $a_c$, the front suspension sprung speed $v_f$, and the rear suspension sprung speed $v_r$ are shown in Table 3.

TABLE 3

| Comparison of MSE in the experiment | | | |
|---|---|---|---|
| MSEvalue | Physicsmodel | Data-drivenmodel | Hybridmodel |
| $a_c$(m/s2)2 | 13.69 | 0.18 | 0.13 |
| $v_f$(×10 − 2 m/s)2 | 2.36 | 0.76 | 0.32 |
| $v_r$(×10 − 2 m/s2)2 | 2.23 | 0.78 | 0.31 |

It can be seen that this invention has good performance in predicting different motion parameters. It is worth mentioning that the hybrid model method of this invention only relies on the vehicle body sensor signal and does not require unsprung information. This advantage enables direct prediction of the dynamic characteristics of the mining truck without the need to build a complex mining truck sensor measurement system.

Figure 10:
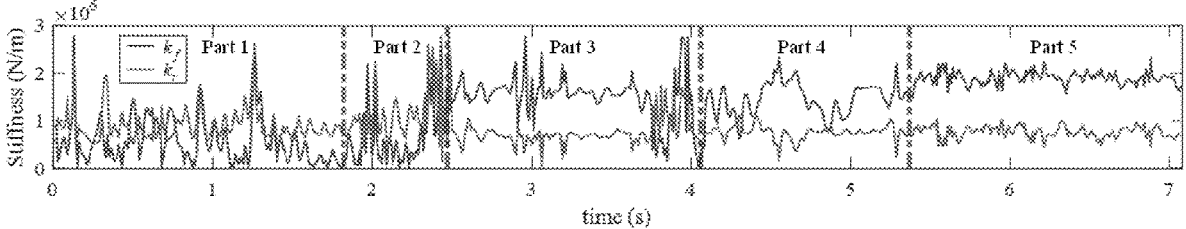
FIG. 10 shows the variation pattern of front and rear suspension stiffness.
Figure 11:
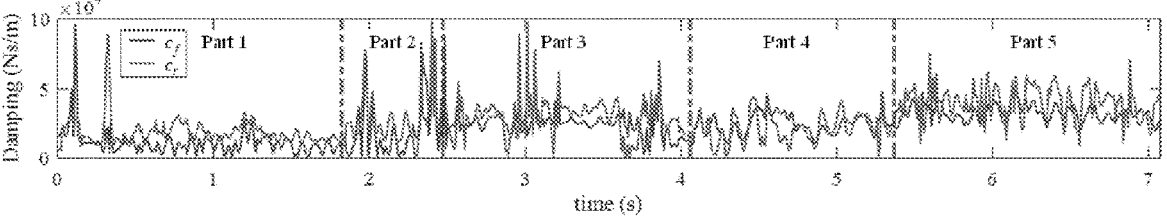
FIG. 11 shows the variation pattern of front and rear suspension damping.

In addition, hydro-pneumatic suspension is particularly common in mining trucks due to its excellent durability. However, due to its design, the modeling of the nonlinear stiffness and damping characteristics of hydro-pneumatic suspension is challenging and difficult to directly apply to the calculation of truck dynamic characteristics. This invention provides the suspension parameters of mining trucks, which are crucial for the structural design and performance prediction of mining trucks. As shown in FIGS. 10 and 11, they are the variation patterns of the front and rear suspension stiffness and damping coefficients.

When the mining truck accelerates, that is, in Part 1 and Part 2 of the working conditions, the rear suspension is compressed, and the front suspension is tensioned. When the hydro-pneumatic suspension is compressed, the internal gas pressure increases, and the stiffness increases, and vice versa. Therefore, as shown in FIG. 10, the stiffness of the rear suspension should be higher than that of the front suspension. When the mining truck decelerates, the stiffness of the front suspension is significantly more significant. In addition, when observing the change of suspension stiffness during the switching process of the mining truck's acceleration and deceleration, it is not difficult to find that the front suspension has obvious changes. This phenomenon is because the cross-section and internal gas mass of the front suspension are relatively small, so under the same volume and pressure change rate (isothermal assumption), its stiffness change is obvious. Since the rear suspension mainly bears the load-bearing function, its cross-section is larger, so the suspension stiffness change is smaller during the working condition switching. Usually, the front and rear suspension stiffness changes should be opposite.

From the perspective of the damping coefficient, as the speed of the mining truck increases, its vertical movement will also intensify. At this time, the speed of the liquid flowing through the throttle hole in the hydro-pneumatic suspension will also tend to accelerate. According to fluid mechanics theory, the damping will increase in this case, as shown in FIG. 11. However, the influencing factors of damping are very complex, and a relatively reasonable explanation is given here.

Compared with the existing technology, this method can only calculate the time-varying stiffness and damping values of the front and rear suspensions of the mining truck when it is running on unstructured roads through the IMU.

The above specific implementation can be partially adjusted by those skilled in the art without departing from the principles and purposes of the invention. The protection scope of the invention is subject to the claims and is not limited by the above specific implementation. All implementation schemes within its scope are bound by the invention.

What is claimed is:

1. A method for identifying time-varying characteristics of heavy-load vehicle suspension, comprising a non-transitory computer readable medium operable on a computer with memory for the method for identifying time-varying characteristics of heavy-load vehicle suspension, and comprising program instructions for executing the following steps of:

a). collecting, using sensors, a sequence state of mining truck operations;

b). predicting, using a deep learning network, one or more parameter-related factors based on the sequence state;

c). estimating, using a linear dynamics model considering longitudinal-vertical coupling effects, stiffness and damping coefficients as key suspension parameters;

d). predicting, using a nonlinear dynamics model considering longitudinal-vertical coupling effects, a predicted state at a next time step based on the one or more parameter-related factors and the key suspension parameters;

e). updating network parameters of the deep learning network using a state loss Lp between the predicted state and a target state detected by the plurality of sensors serves as the loss error term;

wherein the linear dynamics model considering longitudinal-vertical coupling effects comprises a vehicle body with mass $m_c$ and a pitch moment of inertia Ic, and a front axle and a rear axles with unsprung masses $m_{tf}$ and $m_{tr}$ respectively;

wherein suspension forces transmitted to the vehicle body from the front axle and the rear axles are $F_f$ and $F_r$, and road excitations for front and rear tires are $z_{qf}$ and $z_{qr}$;

wherein degrees of freedom (DoF) of the linear dynamics model include a vertical displacement of a center of gravity (CoG)$z_c$, a pitch angle $\theta_c$, and vertical displacements of the unsprung masses of the front axle and the rear axle $z_{tf}$ and $z_{tr}$;

wherein $F_c$ represents an inertial force acting on the CoG due to an acceleration a and a velocity v along an x-axis, and $M_c$ represents a moment of inertia;

wherein the suspension stiffness and damping coefficients are k and c, with subscripts f and r representing front and rear suspensions, and a subscript t representing a tire;

wherein distances from the CoG to the front axle and the rear axles are $a_c$ and $b_c$ respectively, and a vertical distance between the CoG and a pitch center PC is $\Delta h$; and f). improving vehicle stability under heavy-duty and off-road conditions while prolonging suspension system longevity based on the identifying time-varying characteristics of the heavy-load vehicle suspension.

2. The method according to claim 1, wherein the deep learning network comprising a three-layer Long Short-Term Memory (LSTM) network and a fully connected network layer, wherein each layer of the three-layer LSTM has 128 hidden units, and wherein the fully connected network layer is configured to output suspension stiffness and damping correction coefficients.

3. The method according to claim 1, wherein a vertical acceleration and a vertical velocity at a position of the CoG are calculated based on a nonlinear mapping relationship of an Inertial Measurement Unit (IMU), the calculating comprising:

(i) decomposing, according to an Euler theorem of rigid body kinematics, a motion of a point in an absolute coordinate system into a translational displacement in a relative coordinate system plus a vector sum of rotation around a base point, wherein an absolute reference frame is fixed on a ground, a relative coordinate system is fixed on the IMU, and a coordinate system definition corresponds to the IMU itself;

(ii) determining a rotation order of coordinate axes and calculating a rotation matrix by first rotating around a Z-axis corresponding to a yaw angle $\alpha_c$, then rotating around a Y-axis corresponding to the pitch angle $\theta_c$ and finally rotating around an X-axis corresponding to a roll angle $\gamma_c$; and (iii) calculating a speed of the point and taking a derivative of expressions of the rotation matrix with respect to time to calculate an acceleration, including an angular acceleration, of any point rigidly connected to an installation position of the IMU to obtain a motion of the vehicle body.

4. The method according to claim 1, wherein estimating the stiffness coefficient and the damping coefficient comprises:

(i) obtaining a vertical displacement of a sprung mass $F_f$ according to a transfer relationship from a suspension force to a suspension displacement based on a Laplace transform relationship between force and displacement;

(ii) eliminating a vertical displacement of the unsprung masses and rewriting a system transfer equation into a standard form with limited continuous-time white noise e(t) using a continuous-time system simplified refined instrumental variable method (SRIVC) for system identification based on a measured real-time timing signal;

(iii) low-pass filtering the system transfer equation using a continuous-time state variable filter to obtain pre-filtered time derivatives of an input and an output, defining an instrumental vector to eliminate noise influence, and iteratively calculating a parameter estimate until an error between an identification result and a previous identification result satisfies a predetermined threshold; and (iv) evaluating an accuracy of the system transfer equation using a normalized root mean square error (NRMSE) and a final prediction error (FPE) as evaluation indicators.

5. The method according to claim 1, wherein predicting the predicted state at the next time step comprises:

(i) performing a backward differentiation to obtain a discrete system expression of the front suspension and the rear suspension at a time k, and introducing a forward differentiation of a body DoF to represent a speed of the unsprung masses at a time k−1 to solve for the suspension forces $F_f$ and $F_r$ transmitted at the time k;

(ii) summarizing the predicted state of the vehicle body according to the forward differentiation to obtain an iterative method of mining truck body parameters in discrete time; and (iii) updating iterative parameters using the deep learning network to provide refined modeling based on a time series signal.

* * * * *